Jan. 1, 1946.　　W. W. PAGET　　2,392,178
VALVE DEVICE
Filed Jan. 16, 1943

Inventor:
Win W. Paget.
by
Louis A. Maxom,
Atty.

Patented Jan. 1, 1946

2,392,178

UNITED STATES PATENT OFFICE 2,392,178

VALVE DEVICE

Win W. Paget, Michigan City, Ind., assignor to Sullivan Machinery Company, a corporation of Massachusetts Application January 16, 1943, Serial No. 472,567

1 Claim. (Cl. 137—53)

My invention relates to valve devices, and more particularly to supporting means for a valve member.

It is common practice to employ valve mechanisms having yieldable means, such as a diaphragm or a bellows, which responds to fluid pressures for adjusting the position of a valve member. The valve member is usually attached in some manner to the yieldable means, and is adapted to be moved to a valve opening position when the yieldable means responds to a predetermined maximum pressure. As the pressure decreases, the valve member is moved again by the yieldable means toward a closed position. It is evident that the valve member will not always be supported, when in open position, in alinement with its seat. This may be due to a distortion of the yieldable means by unbalanced weights or by an uneven yielding of the yieldable means to fluid pressures. If the valve member is moved toward its seat when it is out of alinement with the latter, it will first engage only one side of the valve seat. To bring the valve member into full engagement with its seat, it will be necessary to subject the valve member to a seating pressure sufficient to cause it to aline itself with the seat. If the valve member is fixed rigidly to the yieldable means, the seating pressure will have to be great enough to cause the yieldable means to adjust itself an amount necessary to permit the alining of the valve member with the seat. Since this pressure may be substantial at times, a repeated opening and closing of the valve member will soon cause the valve member and its seat to be worn out of shape. It is therefore desirable that the valve member be loosely supported by the yieldable means so that it may aline itself with its seat when it is subjected to only slight seating pressures.

According to a preferred embodiment of my invention suitable supporting means for such a valve member may be provided comprising a member which may be rigidly fixed to the yieldable means and having a recess within which one end of a valve member fits loosely. Desirably supported by the rigid member, there will be a spring element engaging the valve member for holding the latter against the bottom of the recess. The inner end of the valve member may be provided with a curved surface which abuts a plane surface at the bottom of the recess so as to provide a rolling contact whereby a tilting of the valve member relative to the rigid member may be easily effected. Other arrangements, such as a plane end on the valve member and a convex bottom for the recess may be used for a like purpose. The spring element desirably engages the valve member in such a way as to reduce to a minimum the resistance offered by the spring element to the tilting of the valve member while yet exerting on the latter a pressure in a direction to maintain the latter perpendicular to the plane of the valve seating line.

An object of this invention is to provide an improved valve device. Another object is to provide improved means for yieldably supporting a valve member. Still another object is to provide improved means for supporting a valve member so that it may be easily tilted about its own axis. Still another object is to provide an improved valve member having a curved surface which is yieldably held against a plane surface on a supporting member so as to permit an easy tilting of the valve member about its own axis. Another object is to provide improved means for yieldably holding a valve member against an abutment in such a manner as to offer but slight resistance to an angular adjustment of the valve member. Other objects of the invention will appear in the course of the following description.

There is shown in the drawing one illustrative embodiment which my invention may assume in practice.

Figure 1:
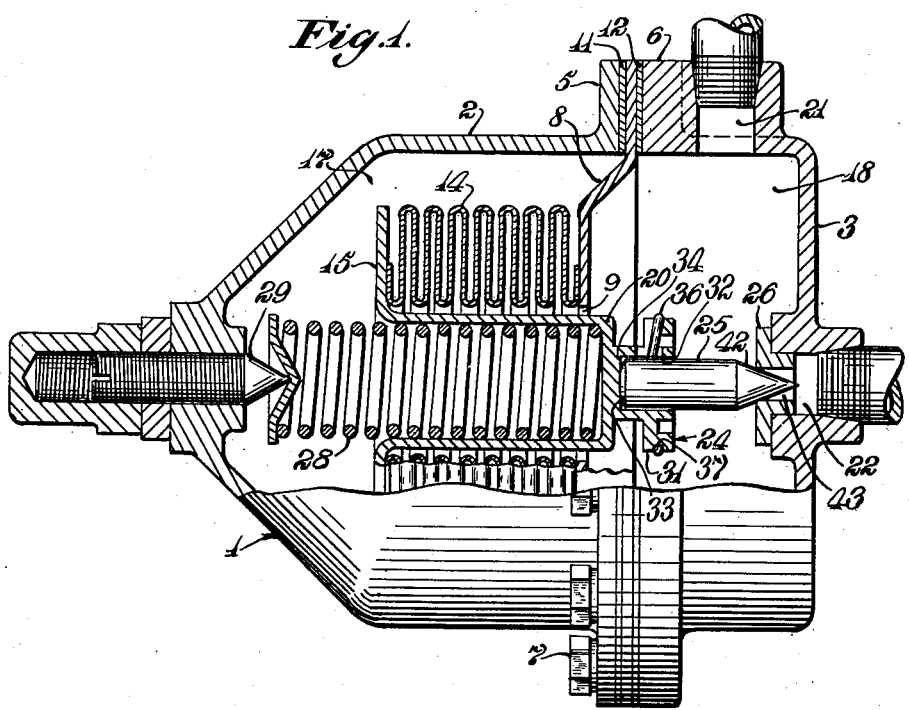
Fig. 1 is a view of a valve mechanism having my invention incorporated therein, parts of the valve mechanism being shown in section.

Referring to the drawing, it will be noted that my invention in its illustrative form is incorporated in a valve mechanism generally designated 1. This valve mechanism comprises, as shown, casing elements 2 and 3 having flange portions 5 and 6 connected together, as by bolts 7. Clamped between the flange portions 5 and 6 is a rigid plate 8 having a central opening 9. Arranged at opposite sides of the clamped portion of the plate 8 are sealing rings 11 and 12. Fixed in any suitable manner to one side of the plate 8 surrounding the opening 9 is a flexible member 14, shown herein as a bellows. Attached to the outer end of the bellows, as by welding, is a member 15 which cooperates with the bellows 14 and the plate 8 to divide the space within the casing elements 2 and 3 into chambers 17 and 18. The member 15 is provided with a recessed portion 20 which projects with some clearance through the bellows and the opening 9, as shown in Fig. 1. Opening into the chamber 18 is a fluid supply passage 21 and a fluid discharge passage 22, the latter passage having its axis arranged in alinement with the axis of the bellows 14 and the opening 9. At the inner end of the recessed portion 20 is my improved supporting means, generally designated 24, for a valve member 25 which is adapted to cooperate with a valve-seat-providing member 26 for controlling the flow of fluid to the discharge passage. A spring 28 acts between the bottom of the recessed portion 20 and an adjustable screw 29 for urging the valve member 25 toward its seat.

Figure 2:
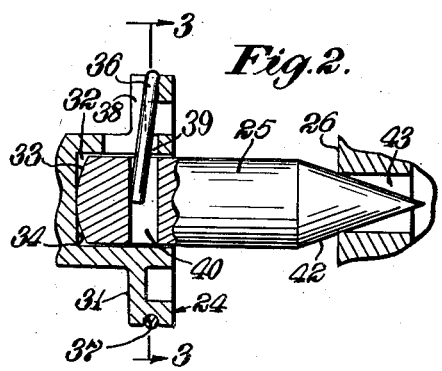
Fig. 2 is an enlarged view showing the valve member and its supporting means, parts being shown in section to facilitate illustration.
Figure 3:
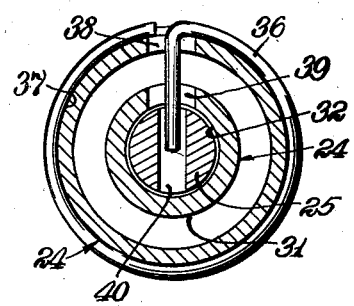
Fig. 3 is a cross sectional view taken on the plane of the line 3—3 of Fig. 2.
Figure 4:
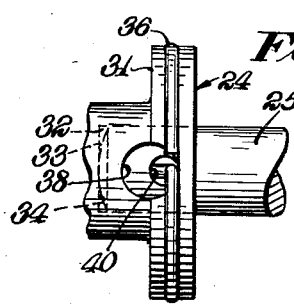
Fig. 4 is a plan view of a portion of the valve member and its supporting means as shown in Fig. 2.

The valve supporting means 24, as shown, comprises an enlarged head 31 formed on the end of the portion 20 of the member 15, and in the head 31 is a recess 32 within which the valve member 25 extends with substantial clearance around its sides. The end of the valve member extending into the recess 32 has a curved surface 33, shown herein as forming a portion of a sphere, and this surface abuts a plane surface 34 at the bottom of the recess 32. The surfaces 33 and 34 are formed in the manner described to provide between them a point contact which lies very nearly in the axis of the valve member even when the latter is tilted in the recess. It will be understood, of course, that the surfaces 33 and 34 may be of other shapes and still provide the desired contact. Surrounding the enlarged head 31 is a spring element 36 fitting within a groove 37, and one end of this spring element is bent inwardly so that it extends through a groove 38 and an opening 39 in the enlarged head 31 into the recess 32. The inner end of the bent portion projects into an opening 40 formed transversely through the valve member 25. The opening 40 is made of such size that the end of the spring element 36 may project into it at an angle, as shown in Fig. 2, and the length of the end or radially extending portion is such that its end may contact the valve member only at a point lying substantially within its longitudinal axis. It will be seen that the valve member is held against the bottom of the recess 32 by the spring element 36, and the points of contact between the valve member and the bottom of the recess and the spring element are such that there is no tendency of the spring to cause the valve member to tilt within the recess or yet to offer any substantial resistance to the tilting of the valve member by some other means. The seating end 42 of the valve member is shown herein as being conical in shape, and this end projects into an opening 43 in the seat member 26 to engage the latter around the edge of the opening for cutting off the flow of fluid to the discharge passage.

When the pressure in the chamber 18 drops below a predetermined value, the spring 28 causes the bellows 14 to be compressed and to seat the valve member. As the pressure in chamber 18 builds up again, the bellows is expanded against the force of the spring 28 and the valve member is unseated to permit fluid to flow to the discharge passage. If the bellows expands unevenly, or if the weight of the parts connected to the unsupported end of the bellows causes it to sag, it will be seen that the valve member will be moved out of perfect alinement with the opening 43 through the seat-providing member 26. When the valve member is moved again toward its seat, it will first contact one edge of the opening 43 and, due to the inclined surface on its seating portion, the valve member will be forced toward a centered position as it is moved further toward its seat. Since the valve member is supported to adjust itself angularly when only slight deflecting forces are applied to it, a centering of the valve member will take place without an appreciable wearing of the parts.

As a result of this invention there is provided a valve member supported in a manner to adjust itself relative to its seat without being subjected to appreciable seating pressures. It will be seen that by reason of such an arrangement, a closer control of fluid flow to the discharge passage is obtained, and the parts of the valve mechanism are subjected to less wear.

While there is in this application specifically described one form which the invention may assume in practice, it will be understood that this form of the same is shown for purposes of illustration and that the invention may be modified and embodied in various other forms without departing from its spirit or the scope of the appended claim.

What I claim as new and desire to secure by Letters Patent is:

In combination, an elongated valve member having a flow controlling portion at least adjacent one end thereof, having between its ends an opening extending transversely thereof and having at its other end an end surface adapted for engagement with an abutment surface, a support member having a radially grooved and circumferentially grooved annular flange and also providing an abutment surface, one of said surfaces being curved whereby tilting of said valve member relative to said support member is facilitated, said annular flange and said abutment surface being so spacially related that said valve member may extend through said annular flange with its end surface in engagement with said abutment surface and with a clearance between said annular flange and said valve member sufficient to permit tilting of the latter, and a spring having a circumferential portion fitting within said circumferential groove and also having a radially extending portion received in said radial groove and inclined to a plane to which the axis of said valve member is perpendicular, said radially extending spring portion projecting into said opening in said valve member and acting on the latter at a point adjacent its axis for pressing said end surface against said abutment surface.

WIN W. PAGET.